Sept. 23, 1930.    L. L. LOMAR    1,776,388
SHOCK ABSORBER
Filed May 19, 1928    4 Sheets-Sheet 4

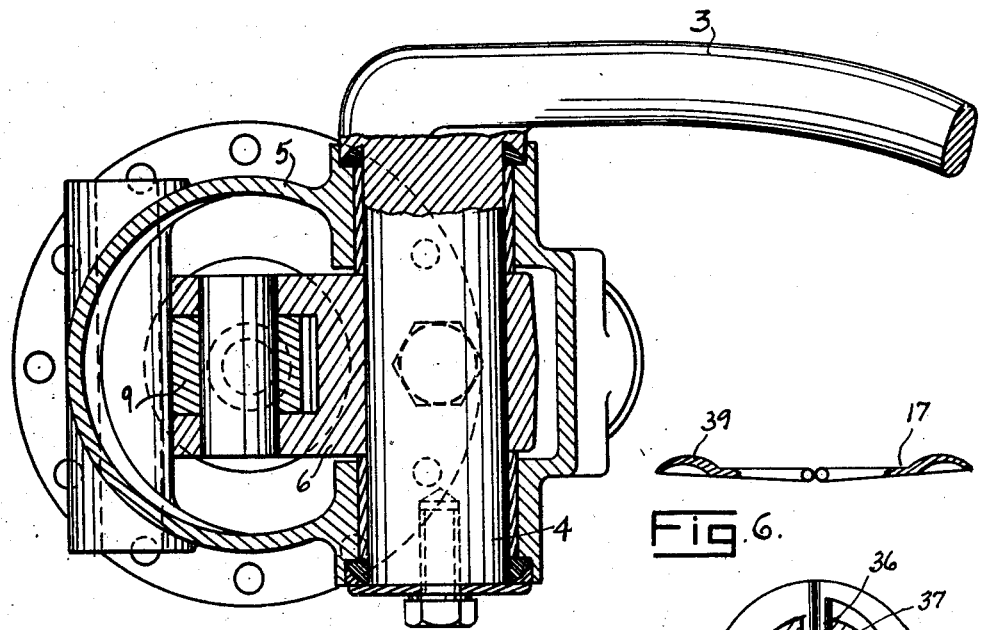
Fig. 3.
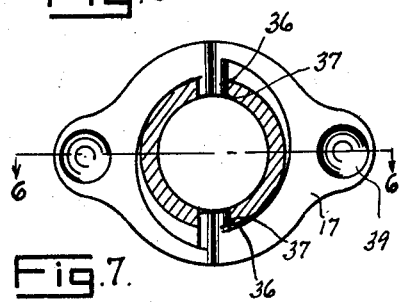
Fig. 6.
Fig. 7.
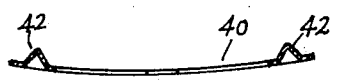
Fig. 8.
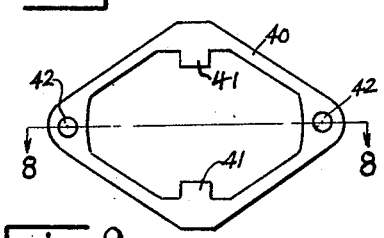
Fig. 9.
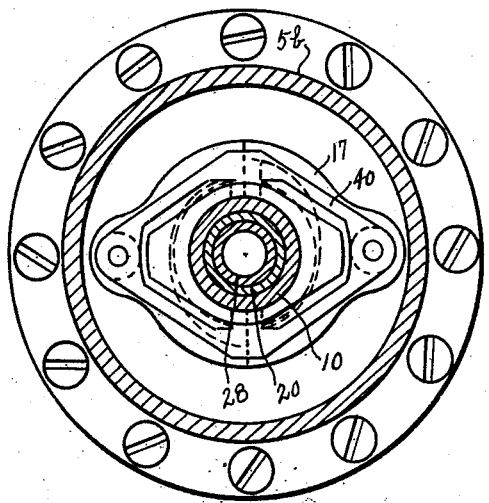
Fig. 5.

Inventor
Louis L. Lomar
By J. Vincent Martin
Attorney

Patented Sept. 23, 1930

1,776,388

UNITED STATES PATENT OFFICE

LOUIS L. LOMAR, OF HOUSTON, TEXAS, ASSIGNOR OF FORTY-NINE ONE-HUNDREDTHS TO THE HOUSTON COMPANY, OF HOUSTON, TEXAS, A CORPORATION OF TEXAS

SHOCK ABSORBER

Application filed May 19, 1928. Serial No. 279,071.

This invention relates to shock absorbers adapted for use on automobiles and the like and has for its general object the provision of certain improvements on the shock absorbers covered by my Letters Patent of the United States No. 1,621,261 of March 15th, 1927, and No. 1,635,284 of July 12th, 1927, and my pending application for Letters Patent of the United States, filed August 26th, 1926, Serial No. 131,684.

Hydraulic shock absorbers now in use embody means adjustable to vary their resistance to the compression and to the rebound of a vehicle spring. But the said means is not so adjustable that their compression resistance can be varied without varying their rebound resistance, or vice versa and it is frequently impossible to make one of the said resistances the desired amount with respect to the other. For example, if a shock absorber is to be used on a car having a heavy body and weak springs, its compression resistance should be made great to prevent a too sudden and too great compression, and its rebound resistance small to permit the controlled spring to resume its normal position. And if it is to be used on a light car equipped with strong springs, its compression resistance should be made small, and its rebound resistance great.

This invention has for one of its specific objects the provision of new and improved adjustable means to vary each of the said resistances independently of the other.

Shock absorbers should offer practically no resistance to slight or normal movements of vehicle springs. Their proper function is to control only great or abnormal movements. And this invention has for another of its specific objects the provision of new and improved means to insure this function.

A further object of the invention is to provide new and improved valves between the two chambers of hydraulic shock absorbers of the type disclosed by my pending application above identified.

Various other objects will hereinafter appear.

Figure 1:
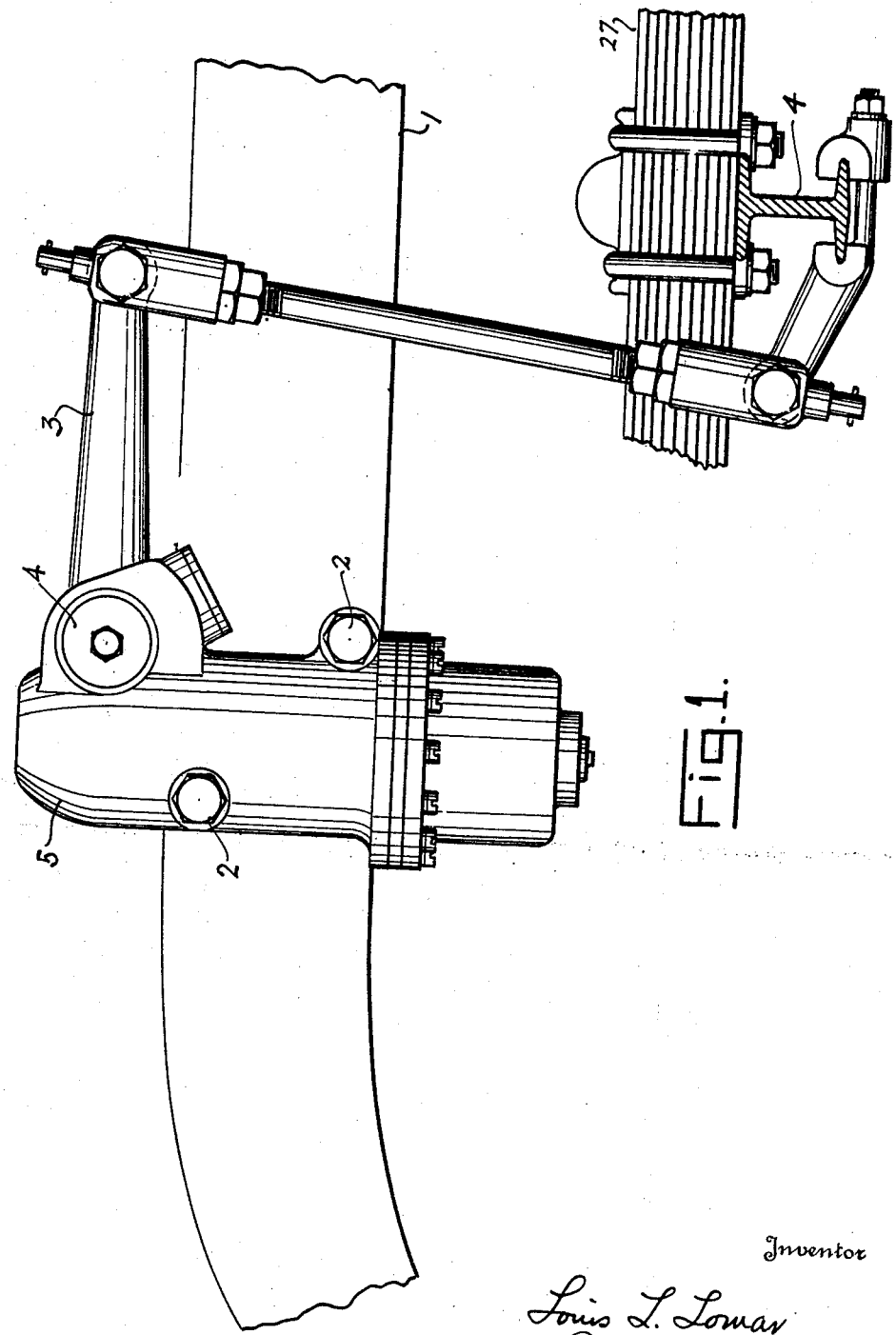
Figure 2:
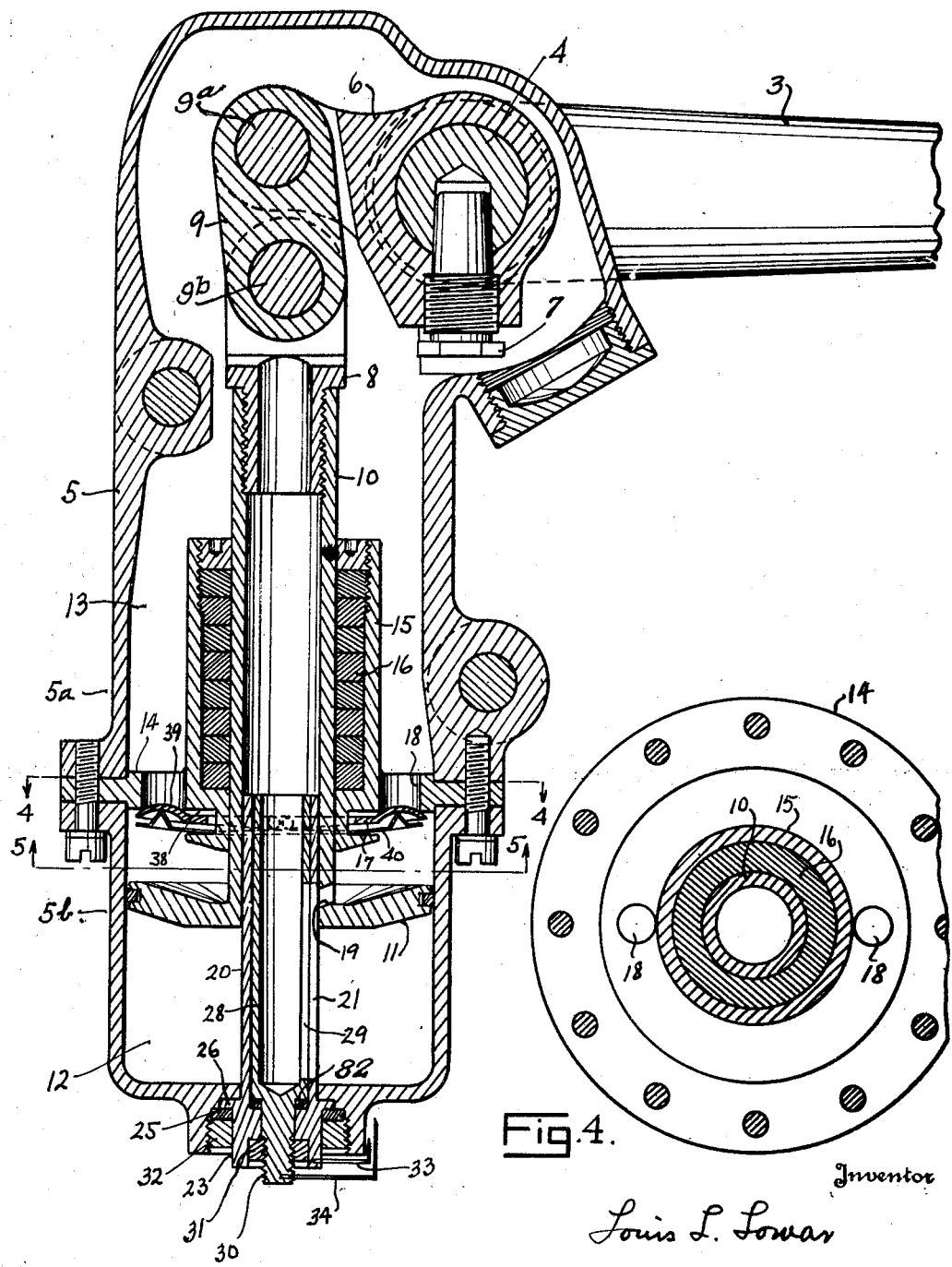
Figure 10:
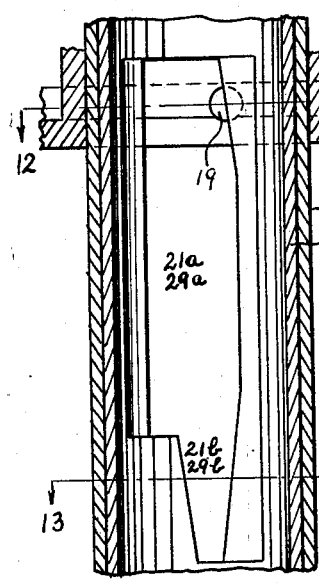
Figure 11:
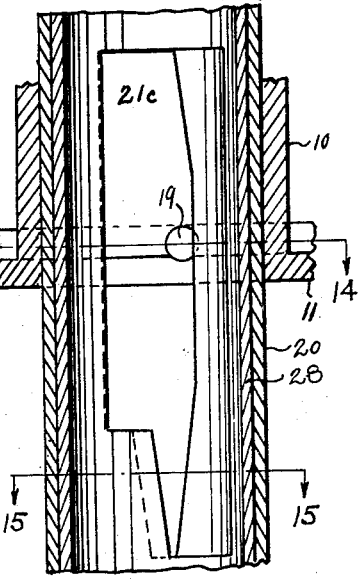
Figure 16:
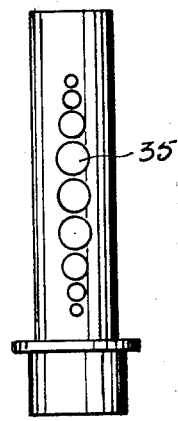
Figure 12:
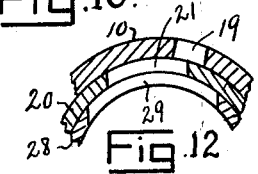
Figure 14:
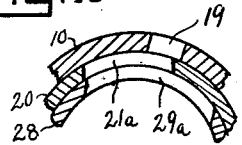
Figure 13:
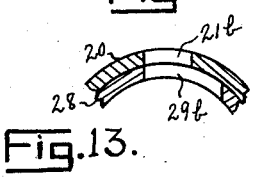
Figure 15:
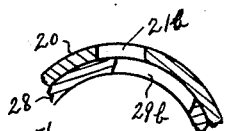

Referring to the accompanying drawings, which are illustrative of the preferred embodiments of the invention, Fig. 1 is a side elevation of the shock absorber operatively interposed between a frame member and an axle of a vehicle; Fig. 2, a vertical sectional view of the shock absorber; Fig. 3, a partly sectional top plan view; Figs. 4 and 5, horizontal sections on the lines 4—4 and 5—5, respectively, of Fig. 1; Figs. 6 and 7, detail views of the valves adapted to be disposed between the two chambers of the casing, the former being a vertical sectional view and the latter a top plan; Figs. 8 and 9 views, similar to Figs. 6 and 7, of the spring for said valve; Figs. 10 and 11, enlarged, fragmentary, sectional elevations of the adjustable valves in different positions the piston being shown fragmentarily; Figs. 12 and 13, enlarged fragmentary horizontal sections on the lines 12—12 and 13—13, respectively, of Fig. 10; Figs. 14 and 15, enlarged fragmentary horizontal sections on the lines 14—14 and 15—15, respectively, of Fig. 11; Fig. 16, a modified form of the outer adjustable valve; and Fig. 17, a modified form of the valves between the two chambers of the casing.

The shock absorber illustrated by the drawings embodies certain elements of a general type common in hydraulic shock absorbers, and these elements and their functions will at first be described.

Referring to Fig. 1, the numeral 5 indicates the casing of the shock absorber which may be mounted on the vehicle frame member 1 by means of bolts 2. The operating lever 3 may be connected to the axle 4, as shown.

Referring to Figs. 2 and 3, it will be observed that the lever 3 has a shaft 4 journalled for rotation in the upper end of the casing 5, the said shaft having an arm 6 locked thereon by the pin 7, the arm 6 and the hollow plug 8 having forked projecting ends, in which the link 9 is held by suitable pins $9^a$ and $9^b$. The lever 3 is thus connected to the hollow piston rod 10, carrying the piston 11 which is reciprocable in the lower chamber 12 of the casing 5.

The partition plate 14, bolted between the adjacent annular flanges of the two sections $5^a$ and $5^b$ of the casing 5, as shown, and having a centrally disposed sleeve 15 to hold suitable packing 16 about the piston rod 10, divides the casing 5 into the two chambers 12 and 13. The valves 17 permit the downward and prevent the upward movement of fluid thru the openings 18 in said plate.

Supported by the lower end of the casing section 5${}^b$, a tubular valve 20 extends upwardly thru the piston 11 and into the hollow piston rod 10, and has a longitudinal slot 21 therein.

The hollow piston rod 10 has a port 19 therein above the piston 11.

When the device is filled with fluid, preferably oil, and operatively interposed between the frame member 1 and the axle 4 of a vehicle, it resists sudden movement of said member toward said axle because the lever 3 must be rotated in an anti-clockwise direction on its pivot 4, and the piston 11 moved downwardly in the chamber 12, and downward movement of the piston 11 is dependent upon the escape of fluid from below said piston thru the slot 21 and such escape is progressively limited. It will be understood that upon downward movement of the piston the fluid passing through the slot 21 moves upwardly into the hollow piston rod 10, a portion of it escaping through the port 19 into chamber 12 above the piston, and the remainder escaping through the hollow plug 8 into the chamber 13 and thence through the valved openings 18 into the chamber 12 above the piston. The valves 17 open to permit movement of fluid from the chamber 13 to the chamber 12.

Sudden movement of the vehicle frame member 1 away from the vehicle axle 4, upon the rebound of the spring, is resisted because the lever 3 must be rotated in a clockwise direction and the piston 11 moved upwardly, and as the valves 17 close and trap the fluid in the chamber 12 above said piston, the upward movement of said piston is dependent upon the escape of fluid thru the port 19 of piston rod 10 and the slot 21 of valve 20. The valve 20 may be so adjusted as to partially close the port 19 and thereby regulate the passage of fluid thru said port.

The adjustment referred to in the immediately preceding paragraph has no practical effect upon the resistance offered to the downward movement of the piston, that is, to the movement toward each other of the frame member and the axle; because said adjustment does not obstruct the passage of fluid through slot 21, and fluid may, therefore, enter the hollow piston rod 10, pass out through the hollow plug 8 into the chamber 13 and thence by the valve 17 into the chamber 12 above the piston 11.

Some similar devices embody means adjustable to control the movement of the piston in both directions, but not either direction independently of the other.

As pointed out in the introductory remarks above, the resistances offered by a shock absorber to the compression of a vehicle spring and to the rebound thereof should be independently variable so that the shock absorber may be applied to any vehicle regardless of its weight and the relative strength of its springs.

The new and improved means provided by this invention will now be described.

The preferred embodiment of the present invention includes the valve 20 to control the passage of fluid through the port 19 and thereby vary the resistance offered to the upward movement of the piston, and consequently the rebound of the vehicle spring; and another valve 28 to control the passage of fluid through the slot 21 and thereby vary the resistance offered to the downward movement of the piston, and consequently the compression of the vehicle spring; the said valves being independently and nicely adjustable to accomplish the desired results herein set forth.

The lower end 23 of the valve 20 extends thru the bottom of the casing section 5${}^b$ and is adjustably held in place by the nut 32 threaded in the annular flange on said section, a packing washer 25 being interposed between said nut and the flange 26 of said valve.

The reduced lower end 30 of the valve 28 extends thru the lower end of the valve 20 and is adjustably held in place by the nut 31 screwed thereon, a suitable washer 82 being interposed between said valves, as shown.

These valves are, by the means just described, independently adjustable.

It will be obvious that the resistance offered to the downward movement of the piston 11 may be varied by changing the positions of the slots 21 and 29 with respect to each other and thus regulating the escape of fluid from below the piston 11. This adjustment may be effected, as illustrated by Figs. 10 to 15, without varying the resistance offered to the upward movement of the piston. In all of these figures, the adjustment of the valve 20 with respect to the piston rod 10, and, therefore, the adjustment of the slot 21 with respect to the port 19, is the same. The adjustment of the slots 21 and 29 with respect to each other, however, is not the same. In Figs. 10, 12, and 13, the slots 21 and 29 are so aligned that the valve 28 offers no resistance to the passage of fluid thru the slot 21, but in Figs. 11, 14, and 15, the valve 28 has been so rotated that the slot 21 is partially closed thereby.

Should it be desired to vary the resistance to the upward movement of the piston 11, it is necessary only to rotate the valve 20 so that the port 19 is more or less closed. And the valve 28 may be so rotated with the valve 20 that the resistance to the downward movement of the piston will remain the same.

By the means described, the shock absorbers may be adjusted for various uses on any automobile. It is therefore unnecessary to make them in different sizes for different cars.

The valves 20 and 28 may be provided with pointers 33 and 34, respectively, to indicate the positions of the slots 21 and 29 and the port 19 with respect to each other.

This invention also provides a shock absorber embodying new and improved means whereby it offers practically no resistance to slight or normal movements of a vehicle spring but controls great or abnormal movements thereof.

The normal position of the piston 11 is substantially intermediate the ends of the slots 21 and 29. This position is indicated by Fig. 11. Now it will be observed that the middle portions 21$^a$ and 29$^a$ of the slots 21 and 29, respectively, are of a great width, and that the side walls of the middle portion 21$^a$ are substantially parallel to each other, as are the side walls of the middle portion 29$^a$. And it will be noted that the side walls of portion 21$^a$ are substantially parallel to the side walls of the portion 29$^a$. The resistance offered to limited movements of the piston 11 in either direction from its normal position is, therefore, quite small, as, during such movements, the portions 21$^a$ and 29$^a$ form wide avenues of escape for the fluid (when the piston moves downwardly) and the resistance to the passage of fluid thru port 19 remains unchanged (when the piston moves upwardly).

On the other hand, great resistance is offered to abnormal downward movement of the piston 11 because the lowermost portions 21$^b$ and 29$^b$ of the slots 21 and 29, respectively, are abruptly reduced, and then tapered toward the ends of said slots; the side walls of the portion 21$^b$ being inclined inwardly and downwardly, and one side wall of portion 29$^b$ being so inclined. And so when the piston moves downwardly an abnormal distance, the portions 21$^a$ and 29$^a$ are covered and the fluid must escape thru the abruptly reduced and tapered lower portions 21$^b$ and 29$^b$.

The upper portion 21$^c$ of the slot 21 is also reduced by the inclination of one of its side walls and so when the piston moves upwardly an abnormal distance the port 19 is partially closed and the avenue of escape of the fluid thereby obstructed.

The resistance to abnormal downward movement of the piston 11 may be varied without appreciably altering the quite small resistance to normal movements thereof. In Figs. 10, 12 and 13, the lower portion 21$^b$ of the slot 21, is unobstructed by the valve 28. In Figs. 11, 14 and 15, the said portion 21$^b$ is partially closed by the valve 28. But in none of these figures is the middle portion 21$^a$ of the slot 21 obstructed by the valve 28. This adjustment is possible because the slot 29 is of a width greater than the slot 21 and the side walls of the middle portion 29$^a$ of the former are parallel to the side walls of the middle portion 21$^a$ of the latter.

Various devices constituting mechanical equivalents of the preferred embodiments just described will at once occur to those skilled in the art. Thus, Fig. 16 illustrates another form, in which the valve is provided with a plurality of apertures 35, the three centermost of which are of an equal diameter, and the outermost of which are of smaller diameters decreasing outwardly. This valve, like the other, will cause little resistance to normal movements of a piston and great resistance to abnormal movements thereof.

The shock absorber disclosed by my said pending application embodies valves to permit downward and prevent upward movement of fluid through the openings in the partition between the two chambers of the casing. But the valves just referred to must be closed by the fluid, and as they are not thereby closed immediately upon the initial return movement of the piston, a part of the fluid is permitted to pass upwardly thru said openings. And when the fluid closes them suddenly and violently, the noise thereby made is objectionable.

The preferred embodiment of this invention includes the valves 17 fitting in the groove 38 of plate 14 and provided with lugs 36 adapted to fit in openings 37 in said plate. The rounded portions 39 of these valves are shaped to fit over the openings 18 in said plate, and form recesses for the reception of the pointed portions 42 of a spring 40. The spring 40 also fits within the groove 38 of the plate 14 and is provided with lugs 36 adapted to fit in said openings 37. This spring is supported by the lowermost wall of the groove 38 of the plate 14.

When the piston moves downwardly and tends to create a vacuum in the chamber 12 above it, the valves 17 are opened against the resistance of the spring 40 by the fluid moving from the chamber 13 through the openings 18 to the chamber 12, but as soon as the piston 11 has reached its lowermost position and before it begins its upward movement the springs 40 close the valves 17. The objectionable escape of fluid and noise above referred to is thereby eliminated.

Figure 17:
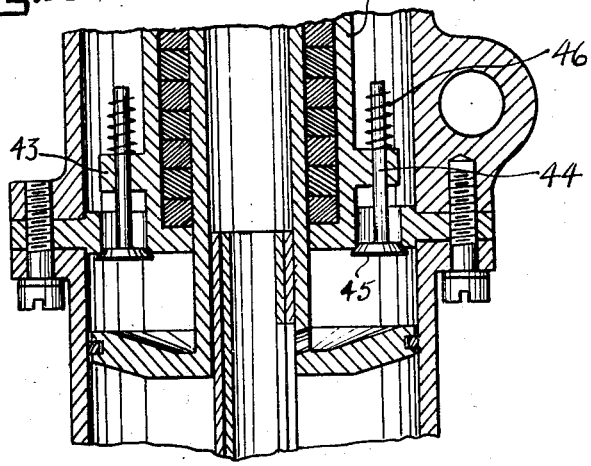

A modified form of the valves just referred to is disclosed by Fig. 17. In this form, the sleeve 15' has a pair of oppositely disposed lugs 43 thereon having openings therein through which extend the rods 44 of the valves 45. Springs 46 serve to normally hold said valves closed.

This invention is not limited to the specific embodiments herein disclosed, and various changes may be made without departure from the scope of the following claims.

I claim:

1. A shock absorber having a casing adapted to contain a fluid, a piston reciprocable in said casing, a hollow piston rod communicating with the interior of the casing on both sides of said piston, means to control the passage of fluid into said rod when said piston moves in one direction and means to control the passage of fluid into said rod when said piston moves in the other direction, said two means being adjustable independently of each other.

2. In a shock absorber, a casing adapted to contain a fluid, a piston reciprocable in said casing, a hollow piston rod on one side of said piston and having a port therein, and a pair of tubular valves on the other side of said piston and extending into said rod, each of said valves having a longitudinal slot therein and being adjustable independently of the other.

3. In a shock absorber, a casing adapted to contain a fluid, a piston reciprocable in said casing, a hollow piston rod on one side of said piston and having a port therein, and a pair of tubular valves on the other side of said piston and extending into said rod, each of said valves having a longitudinal slot therein and being adjustable independently of the other, the slot in one of said valves having tapered end portions.

4. In a shock absorber, a casing adapted to contain a fluid, a piston reciprocable in said casing, a hollow piston rod on one side of said piston and having a port therein, and a pair of tubular valves on the other side of said piston and extending into said rod, each of said valves having a longitudinal slot therein and being adjustable independently of the other, the slot in one of said valves having an abruptly reduced end portion.

5. A shock absorber having a casing, a partition dividing said casing into a reservoir chamber and a piston chamber, a piston reciprocable in said piston chamber, a hollow piston rod extending from said piston to said reservoir chamber, said rod having a port in its side adjacent said piston, and a pair of tubular valves in said piston chamber and extending into said rod, each of said valves having a longitudinal slot therein and being adjustable independently of the other.

6. In a shock absorber, the combination of a pair of tubular valves, one of said valves being mounted in the other of said valves, and each of said valves having a longitudinal slot therein.

7. A shock absorber having a casing, a partition dividing said casing into a reservoir chamber and a piston chamber, a piston reciprocable in said piston chamber, a hollow piston rod extending from said piston to said reservoir chamber, said rod having a port in its side adjacent said piston, and a pair of tubular valves in said piston chamber and extending into said rod, each of said valves having a longitudinal slot therein, and being adjustable independently of the other, and the other end portion of said slot being tapered toward the other end of said slot.

8. In a shock absorber, the combination of a pair of tubular valves, one within the other, each of said valves having a longitudinal slot therein, the side walls of the middle portions of said slots being substantially parallel, and an end portion of one of said slots being abruptly reduced.

9. In a shock absorber, the combination of a pair of tubular valves, one within the other, each of said valves having a longitudinal slot therein, the side walls of the middle portions of said slots being substantially parallel, and an end portion of one of said slots being abruptly reduced, and tapered toward said end.

10. In a shock absorber, the combination of a pair of tubular valves, one within the other, each of said valves having a longitudinal slot therein, the side walls of the middle portions of said slots being substantially parallel, and one end portion of each of said slots being abruptly reduced and then tapered toward said end.

11. A shock absorber having a casing adapted to contain a fluid, a piston reciprocable in said casing, a hollow member integral with said piston and having a port on one side of said piston, and a pair of tubular slotted valves mounted in said casing on the other side of said piston, one of said valves extending adjacent said member to control the passage of fluid through said port, and the other of said valves extending adjacent the first-mentioned valve to control the passage of fluid through the slots of said valves.

12. A shock absorber having a casing adapted to contain a fluid, a piston reciprocable in said casing, a hollow member integral with said piston and having a port on one side of said piston, and a pair of tubular slotted valves mounted in said casing on the other side of said piston, one of said valves extending adjacent said member to control the passage of fluid through said port, and the other of said valves extending adjacent the first-mentioned valve to control the passage of fluid through the slots of said valves, each of said valves being independently adjustable.

13. A shock absorber having a casing adapted to contain a fluid, a piston reciprocable in said casing, a hollow member integral with said piston and having a port on one side of said piston, and a pair of tubular valves mounted in said casing on the other side of said piston, one of said valves being mounted within the other of said valves, each of said valves having a longitudinal slot therein, the ends of said slots remote from said piston being reduced, one of said valves extending into said member to control the passage of fluid through said port, and the other of said valves serving to control the passage of fluid through said slots.

14. A shock absorber having a casing adapted to contain a fluid, a piston reciprocable in said casing, a hollow member integral with said piston and having a port on one side of said piston, and a pair of tubular valves mounted in said casing on the other side of said piston, one of said valves being mounted within the other of said valves, each of said valves having a longitudinal slot therein, the ends of said slots remote from said piston being reduced, one of said valves extending into said member to control the passage of fluid through said port, and the other of said valves serving to control the passage of fluid through said slots, each of said valves being independently adjustable.

In testimony whereof, I hereunto affix my signature.

LOUIS L. LOMAR.